US010679386B2

(12) United States Patent
Hamby et al.

(10) Patent No.: US 10,679,386 B2
(45) Date of Patent: *Jun. 9, 2020

(54) DRAGGABLE MAPS

(71) Applicant: Uber Technologies, Inc., San Francisco, CA (US)

(72) Inventors: Brent Hamby, Oakland, CA (US); Geoffrey Rummens Hendrey, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/157,322

(22) Filed: Oct. 11, 2018

(65) Prior Publication Data
US 2019/0043227 A1 Feb. 7, 2019

Related U.S. Application Data

(63) Continuation of application No. 15/229,262, filed on Aug. 5, 2016, now Pat. No. 10,127,692, which is a
(Continued)

(51) Int. Cl.
G09B 29/10 (2006.01)
G06T 11/20 (2006.01)
(Continued)

(52) U.S. Cl.
CPC ............ *G06T 11/20* (2013.01); *G06F 3/0481* (2013.01); *G06F 16/29* (2019.01); *G06F 16/444* (2019.01);
(Continued)

(58) Field of Classification Search
CPC ................. G06F 16/444; G09B 29/10; G09B 29/101–109
See application file for complete search history.

(56) References Cited

U.S. PATENT DOCUMENTS 6,331,869 B1    12/2001 Furlan et al.
6,674,445 B1 *   1/2004 Chithambaram ....... G06T 17/05
                                                345/619
(Continued)

OTHER PUBLICATIONS

Chinese Second Office Action, Chinese Application No. 200780012454.9, dated Mar. 10, 2011, 5 pages.
(Continued)

*Primary Examiner* — Mark K Zimmerman
*Assistant Examiner* — Jonathan M Cofino
(74) *Attorney, Agent, or Firm* — Fenwick & West LLP

(57) ABSTRACT

A web server receives a request from a client specifying a location and a bounding area. A mapping engine creates a tile grid centered at the specified location. A seed tile is created, including or adjacent to the center location. The web server creates a resource identifier for each tile in the tile grid, and returns the tile grid including the resource identifiers to the client. The resource identifier for each tile includes the location of the seed tile and a position offset for the tile relative to the seed tile, in one embodiment specified in units of northward and eastward movement. The client requests tiles from the system using the resource identifiers previously provided by the system. Upon receiving the request, the mapping engine dynamically renders each requested tile using map data from the map database, and the web server returns the dynamically-generated tiles to the requesting client.

20 Claims, 7 Drawing Sheets

Related U.S. Application Data continuation of application No. 11/706,065, filed on Feb. 13, 2007, now Pat. No. 9,412,199.

(60) Provisional application No. 60/773,287, filed on Feb. 13, 2006.

(51) Int. Cl.

| | | |
|---|---|---|
| *G06F 16/29* | (2019.01) | |
| *G06F 16/44* | (2019.01) | |
| *G06F 16/9537* | (2019.01) | |
| *G06T 7/70* | (2017.01) | |
| *G06T 7/90* | (2017.01) | |
| *G06F 3/0481* | (2013.01) | |
| *G06T 11/40* | (2006.01) | |
| *G06T 17/05* | (2011.01) | |
| *G06T 7/60* | (2017.01) | |
| *G06T 11/60* | (2006.01) | |

(52) U.S. Cl.
CPC ............ *G06F 16/9537* (2019.01); *G06T 7/60* (2013.01); *G06T 7/70* (2017.01); *G06T 7/90* (2017.01); *G06T 11/40* (2013.01); *G06T 11/60* (2013.01); *G06T 17/05* (2013.01); *G09B 29/106* (2013.01); *G06T 2200/32* (2013.01); *G06T 2207/20021* (2013.01); *G06T 2207/30181* (2013.01); *G09G 2310/04* (2013.01); *G09G 2360/122* (2013.01)

(56) References Cited

U.S. PATENT DOCUMENTS

| | | | | |
|---|---|---|---|---|
| 2002/0067374 A1* | 6/2002 | Kenyon | ................... | G06F 16/29 715/764 |
| 2004/0160441 A1 | 8/2004 | Lokovic et al. | | |
| 2004/0167806 A1* | 8/2004 | Eichhorn | ............... | G02B 21/26 705/3 |
| 2004/0217980 A1* | 11/2004 | Radburn | ................. | G06F 16/51 345/672 |
| 2005/0116966 A1* | 6/2005 | Graham | .................. | G06T 17/05 345/661 |
| 2005/0166153 A1* | 7/2005 | Eytchison | ............. | G06F 3/0482 715/747 |
| 2005/0270299 A1* | 12/2005 | Rasmussen | ............. | G06T 17/05 345/661 |
| 2005/0270311 A1* | 12/2005 | Rasmussen | ............ | G02B 21/26 705/3 |
| 2006/0010100 A1 | 1/2006 | McAvoy et al. | | |
| 2006/0072831 A1 | 4/2006 | Pallister | | |

OTHER PUBLICATIONS

European Extended Supplementary Search Report, European Application No. 07750526.1, dated Sep. 9, 2011, 8 pages.

Hendrey, G. et al., "deCarta's Open Architecture for AJAX Draggable Maps," Feb. 28, 2006, 6 pages, [Online] [Retrieved on Apr. 7, 2011] Retrieved from the Internet<URL:http://www.decarta.com/wp-content/uploads/2010/0-5/DDS.sub.--Web.sub.--Services.sub.--AJAX.sub.--Whitepaper.pdf>.

Hendrey, G., "AJAX Draggable Map Whitepaper," Feb. 28, 2006, 1 page, [Online] [Retrieved on Aug. 31, 2011] Retrieved from the Internet<URL:http://liferay50.dz.decarta.com/web/guest/forums/message_-boards/m ...>.

Mitchell, T., "Build AJAX-Based Web Maps Using ka-Map," XML. com, Aug. 10, 2005, 12 pages, [Online] [Retrieved on Aug. 31, 2011] Retrieved from the Internet<URL:http://www.xml.com/1pt/a/1606>.

PCT International Search Report and Written Opinion, PCT/US07/03695, dated Feb. 14, 2008, 7 pages.

Potmesil, M., "Maps Alive: Viewing Geospatial Information on the WWW," Computer Networks and ISDN Systems, Sep. 1, 1997, pp. 1327-1342, vol. 29, No. 8-13.

United States Advisory Action, U.S. Appl. No. 11/706,065, dated Nov. 1, 2013, 3 pages.

United States Office Action, U.S. Appl. No. 11/706,065, dated Apr. 6, 2012, 16 pages.

United States Office Action, U.S. Appl. No. 11/706,065, dated Apr. 12, 2011, 14 pages.

United States Office Action, U.S. Appl. No. 11/706,065, dated Aug. 31, 2010, 26 pages.

United States Office Action, U.S. Appl. No. 11/706,065, dated Feb. 17, 2010, 18 pages.

United States Office Action, U.S. Appl. No. 11/706,065, dated Jan. 3, 2013, 19 pages.

United States Office Action, U.S. Appl. No. 11/706,065, dated May 26, 2009, 8 pages.

United States Office Action, U.S. Appl. No. 15/229,262, dated Dec. 18, 2017, 26 pages.

\* cited by examiner

```
 1 <PortrayMapRequest>
 2   <Output width="300" height="300" format="GIF">
 3     <CenterAddress>
 4       <Radius unit="KM">1</Radius>
 5       <Address countryCode="US">
 6         <freeFormAddress>
 7           4 n 2nd st, san jose ca
 8         </freeFormAddress>
 9       </Address>
10     </CenterAddress>
11     <TileGrid rows="4" columns="4"/>
12   </Output>
13 </PortrayMapRequest>
```

```
<TileGrid columns="4" rows="4">
   <CenterContext SRS="WGS-84">
    <CenterPoint>
      <pos>41.002 -72.000896</pos>
    </CenterPoint>
    <Radius unit="KM">1.0</Radius>
   </CenterContext>
    <Tile col="0" row="0">
     <Map>
     <Content height="300" format="GIF" width="300">
<URL>http://ws.telcontar.com:8080/openls/image/TILE?LLMIN=41.00361987041037,-
72.00447335745504&LLMAX=41.00469978401728,-
72.00304241447303&WIDTH=300&HEIGHT=300&FORMAT=GIF&CLIENTNAME=someclient&SESSIONID=999
&N=0&E=-1</URL>
     </Content>
     <BBoxContext>
         <pos>41.00361987041037 -72.00447335745504</pos>
         <pos>41.00469978401728 -72.00304241447303</pos>
      </BBoxContext>
```

```xml
<PortrayMapRequest>
  <Output width="300" height="300" zoom="1.0">
    <CenterContext SRS="WGS-84">
      <CenterPoint>
        <pos>41.002 -72.000896</pos>
      </CenterPoint>
      <Radius unit="KM">1.0</Radius>
    </CenterContext>
    <TileGrid rows="4" columns="4">
      <Pan direction="E" numTiles="13.17"/>
      <Pan direction="S" numTiles="4.234"/>
    </TileGrid>
  </Output>
</PortrayMapRequest>
```

Fig. 9

```xml
<PortrayMapRequest fitOverlays="true">
    <Output height="400" width="400">
      <CenterAddress>
        <Radius unit="KM">5</Radius>
        <Address countryCode="US">
          <freeFormAddress>300 Second Ave, 11111</freeFormAddress>
        </Address>
      </CenterAddress>
      <TileGrid rows="3" columns="3"/>
    </Output>
    <Overlay>
      <RouteGeometry>
      <LineString ">
        <pos>41.0039 -72.003</pos>
        <pos>41.003 -72.003</pos>
        <pos>41.003 -72.003</pos>
        <pos>41.002 -72.003</pos>
        <pos>41.002 -72.003</pos>
        <pos>41.001 -72.003</pos>
        <pos>41.001 -72.002</pos>
        <pos>41.001 -72.002</pos>
        <pos>41.001 -72.001</pos>
        <pos>41.001 -72.001</pos>
        <pos>41.001 -72.00011</pos>
      </LineString>
      </RouteGeometry>
    </Overlay>
</PortrayMapRequest>
```

DRAGGABLE MAPS

CROSS-REFERENCE TO RELATED APPLICATIONS

This application is a continuation of U.S. patent application Ser. No. 15/229,262, filed Aug. 5, 2016, which is a continuation of U.S. Pat. No. 9,412,199, which issued on Aug. 9, 2016, and which claims the benefit of U.S. Provisional Application 60/773,287, filed on Feb. 13, 2006. These applications are incorporated by reference herein in their entirety.

BACKGROUND OF THE INVENTION

Field of the Invention

The present invention is related to generation of digital maps, including dynamic rendering of map tiles.

Description of the Related Art

The use of Ajax (Asynchronous JavaScript and XML) in building web-based applications offers the appearance of responsiveness and interactivity to users, making Ajax a popular technique. Web-based mapping and driving directions applications often are implemented using Ajax. Because not all of the page has to be reloaded when only a portion of its contents change, Ajax offers users of client browsers the opportunity to drag a map quickly around a screen, giving the appearance of a locally-based application, rather than a typical client-server interaction.

One drawback to the conventional approach to map rendering is that if a client is attempting to determine the boundaries of tiles in their spatial positions, the client has to know the projection that is being used to draw the map. In addition, because conventional applications use pre-rendered maps, they have certain drawbacks. Pre-rendered maps are created by pre-rendering a typically very large image, and cutting it into a set of separate, smaller images. Those smaller images are then typically further divided into sets of even smaller images known as tiles. Because the center of a tile grid is predetermined, it is difficult to render a map centered on a specific requested location such as a street address, without performing some additional steps to slide the grid to the desired location. In addition, tile sizes are predefined, making it impossible for an application to request a tile of a different size, unless such a tile has been pre-rendered. Further, zoom levels are fixed with pre-rendered maps, based on a number of world maps that have been made available at predetermined scales. Lastly, the appearance of a map is determined at rendering time. Accordingly, an application cannot request on the fly that all roads be in red, or that certain features be highlighted, etc., but rather must accept whatever the map designer chose as the map appearance when the map was rendered.

Accordingly, a need exists in the art for systems and methods to provide an improved architecture for draggable maps.

SUMMARY OF THE INVENTION

The present invention enables dynamic rendering of digital maps. A system in an embodiment of the present invention includes a web server, a mapping engine and a map database. The web server receives a request from a client specifying a location and a bounding area. In one embodiment the location is specified as an address, while in an alternative embodiment it is specified as a latitude and longitude. The mapping engine performs a geocoding operation on the address, if necessary, and creates a tile grid centered at the specified location. A seed tile is then created, either including or adjacent to the center location, depending on whether the tile grid has an even or odd number of rows and columns. The web server creates a resource identifier such as a URL for each tile in the tile grid, and returns the tile grid including the resource identifiers to the client. The resource identifier for each tile includes the location of the seed tile and a position offset for the tile relative to the seed tile, in one embodiment specified in units of northward and eastward movement.

The client in one embodiment includes an off-screen peripheral buffer. This allows peripheral images to be loaded before the user drags them on screen when dragging the displayed map.

The client requests tiles from the system using the resource identifiers previously provided by the system. Upon receiving the request, the mapping engine dynamically renders each requested tile using map data from the map database, and the web server returns the dynamically-generated tiles to the requesting client.

As a user of the client drags the map in the client user interface, the client requests additional tiles from the server. The additional tiles are requested using the same resource identifiers previously used for each location in the tile grid, except that the client first modifies the position offset appropriately, for example by incrementing a northing offset by +4 if the user has dragged the map north by one tile in a 4×4 tile grid.

Because map tiles are rendered dynamically, they can be centered at essentially arbitrary locations. Further, the appearance of each tile can be changed by using parameters in the resource identifier request from the client to the server—for example, to change colors on the map. Overlay data such as route guidance can be rendered as part of the tile, since the tile is rendered dynamically, when requested by the client. Zooming is also simplified compared to conventional methods, and can be achieved by providing the server with a zoom factor along with a number of tiles the image has been panned from the original centered location.

BRIEF DESCRIPTION OF THE DRAWINGS

FIG. 3 illustrates a request by a client to a server for a tile grid in accordance with an embodiment of the present invention.

FIG. 5 illustrates a response by a server to a client for a request for a trial grid in accordance with an embodiment of the present invention.

FIG. 8 illustrates a request by a client to a server for a tile grid including a zoom factor in accordance with an embodiment of the present invention.

FIG. 9 illustrates a request by a client to a server for a tile grid including overlays in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
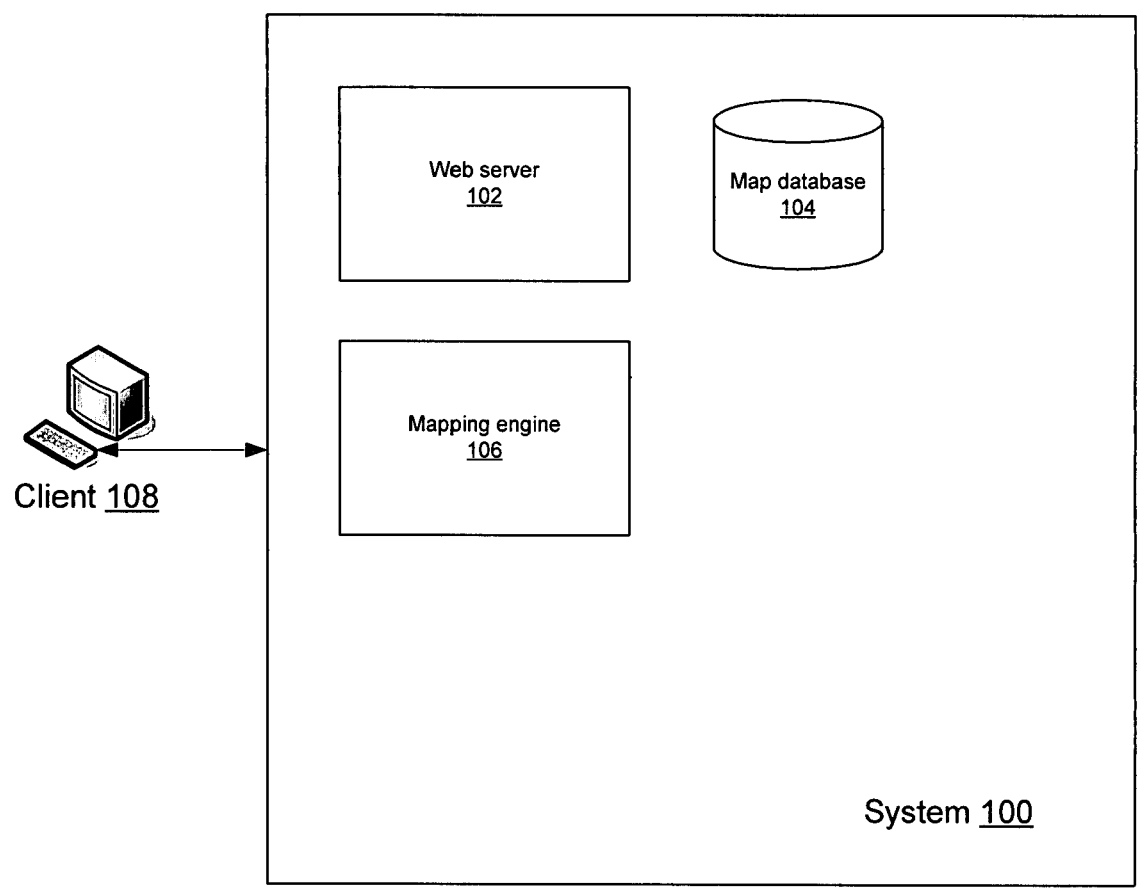
FIG. 1 illustrates a system for rendering digital maps in accordance with an embodiment of the present invention.

FIG. 1 illustrates a system for providing dynamically-rendered maps in accordance with an embodiment of the present invention. System 100 includes a map database 104, a mapping engine 106 and a web server 102. Also shown is a client 108.

Map database 104 contains digitized map data used by mapping engine 106 for routing, geocoding, map rendering and other geospatial functions. Mapping engine 106 receives and responds to requests from web server 102 for map data, including dynamically-rendered tiles. Web server 102 includes a conventional web server application such as the Apache HTTP Server by the Apache Software Foundation or the Internet Information Services web server by Microsoft. In addition, web server 102 includes logic for receiving requests for dynamic maps from client 108, communicating the requests to mapping engine 106, receiving the dynamic map data and providing the map data to client 108.

Also shown in FIG. 1 is client 108. Client 108 in one embodiment uses a conventional web browser such as Internet Explorer by Microsoft or Firefox by Mozilla to execute JavaScript code that formulates XML requests for dynamic maps from web server 102. In alternative embodiments, XML may be specified directly by the client, or other applications may be used to generate XML requests to system 100. The operation of the elements of system 100 is described further below.

Figure 2:
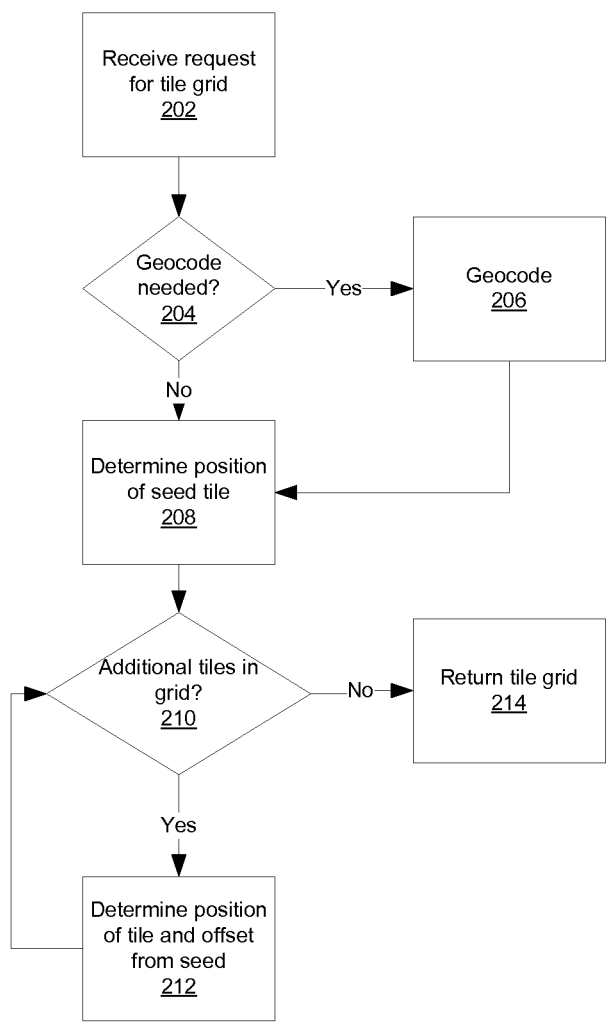
FIG. 2 is a flowchart illustrating a method for providing a tile grid in accordance with an embodiment of the present invention.

FIG. 2 illustrates a method for responding to a request for a tile grid in accordance with an embodiment of the present invention. Initially, web server 102 receives 202 a request from client 108 for a tile grid. In one embodiment, client 108 makes the request by providing an XML query. An example of such a query is illustrated in FIG. 3. In listing 300, line 2 specifies a desired pixel width and height attributes for each tile within the grid. Lines 3-10 indicate that the address to be centered on is "4 N. $2^{nd}$ St, San Jose, Ca" with a 1 km radius bounding area. Line 11 indicates that the grid should include 4 rows and 4 columns.

Server 102 then determines 204 whether the request includes an address that must be geocoded, for example a street address. If so, mapping engine 106 performs a geocoding operation and returns a latitude and longitude for the specified address to web server 102. Next, or if no geocoding was required, server 102 determines 208 the position of a seed tile. In one embodiment, if the number of rows and columns is even, the seed tile is the tile that borders the center to the northeast. If the number of rows and columns is odd, seed tile is the tile that includes the center d02. Those of skill in the art will appreciate that other tiles can be defined as the seed tile in alternative embodiments.

Figure 4:
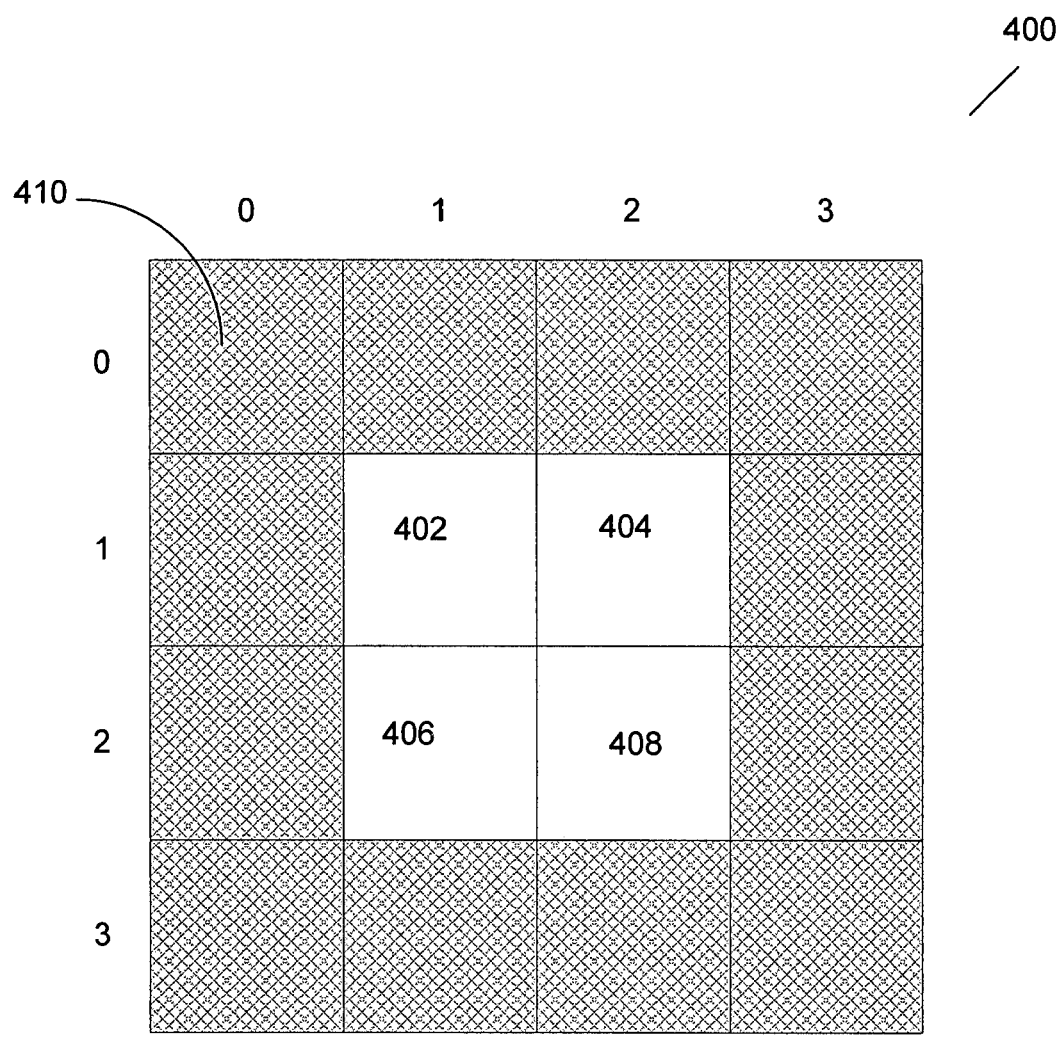
FIG. 4 illustrates a tile grid in accordance with an embodiment of the present invention.

FIG. 4 illustrates a grid 400 of map tiles 410. (Note that reference 410 is intended to refer generally to any tile within grid 400.) Tile grid 400 is an example of the general case in which there are M rows and N columns, and as illustrated includes 4 rows, labeled for convenience in FIG. 4 as 0-3; and 4 columns, labeled 0-3. In one embodiment, image width and height are the same for each image in the grid, although any pixel width and height can be specified by an application.

In FIG. 4, there are an even number (4) of rows and columns, and thus tile 404 is chosen as the seed tile.

In addition to the grid dimensions and image pixel dimensions, in one embodiment some of the tiles are used by client 108 as an off-screen peripheral buffer. This allows the peripheral images to be loaded before the user drags them on screen. In such an embodiment, new off-map tiles are loaded into the off-screen buffer, which minimizes the visibility of tile loading, and increases the user's perception that the map is a single, continuous sheet, as opposed to a grid of tiles. In FIG. 4, tiles 402, 404, 406 and 408 are displayed on screen, while the remaining shaded tiles are in the peripheral off-screen buffer. In alternative embodiments, client 108 stores more or fewer tiles in an off-screen peripheral buffer, depending on the preference of the implementer.

In one embodiment, the position of a tile 410 is expressed as the coordinates of two of the opposite corners of seed tile 404 and a relative position to seed tile 404. In the case of seed tile 404, the offset is 0 in both the north and east directions.

Once the position of the seed tile is determined, web server 102 next checks 210 whether 210 there are additional tiles in the tile grid 400 whose positions have not been specified. If so, then web server 102 determines 212 the position of a next tile, including its offset north and east from seed tile 404. For example, in FIG. 4, tile 402 has an offset of 0 north and −1 east. Although we describe using northward and eastward offsets here, those of skill in the art will appreciate that other offset specifiers could be used, for example southward and westward.

Once the position of each tile in the tile grid 400 has been determined, web server 102 returns the tile grid 400 to client 108.

FIG. 5 provides an example of a portion of a response 500 by server 102 to a tile grid request from client 108. In the XML of response 500, a tile grid with a radius of 1 km has been returned centered at coordinates (41.002, −72.000896). The tile grid has 4 columns and 4 rows, and the height and width of each tile is 300 pixels. Further, tiles are in GIF format. Response 500 also includes coordinates of a bounding area for tile grid 400, as well as a resource identifier, such as a URL, for each tile in tile grid 400. Note that only one URL is included in FIG. 5 for clarity of illustration—the tile grid 400 of FIG. 4 has 16 tiles and would be represented in a tile grid response by 16 URL tags.

The URL illustrated in response 500 includes as parameters the coordinates of seed tile 404, width and height parameters, a format parameter, a client name parameter, and a session ID parameter. Also included are the northing and easting values for the tile, in this case 0 north and −1 east. From FIG. 4 it can be seen that the tile identified by this URL is tile 402, located 0 north and −1 east (i.e. 1 west) of seed tile 404.

Figure 6:
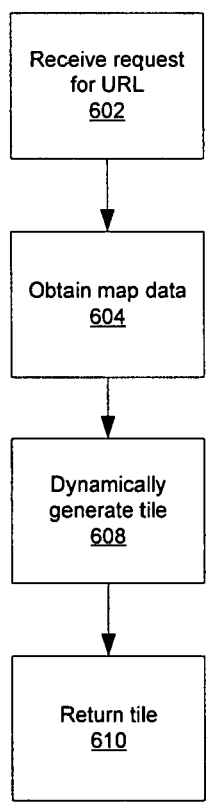
FIG. 6 illustrates a method for dynamically rendering a map tile in accordance with an embodiment of the present invention.

After receiving tile grid 400, client 108 then requests the tiles that are to be displayed by the browser, including any tiles the client requires to fill its off-screen buffer. Referring to FIG. 6, web server 102 receives 602 a request for a tile identified by a URL or other resource identifier. Web server 102 converts the request into a query suitable for mapping engine 106, and passes the query including any specified parameters to mapping engine 106. Mapping engine 106 retrieves 604 map data from map data database 104 and dynamically renders 608 the tile, which it then returns 610 via web server 102 to client 108.

In one embodiment, system 100 includes a cache, for example a least-recently used (LRU) cache, and web server 402 caches each tile after it has been dynamically rendered. In such an embodiment, when system 100 receives a request for a tile, web server 102 first checks the cache to determine whether the tile already exists in the cache, and if so returns the cached version; if not, the tile is dynamically rendered as described above.

Because system 100 renders tiles dynamically upon request, the appearance of the tile can be specified at request time, for example using parameters in the URL request from the client 108. Specifying rendering parameters in the URL can be implemented in a number of ways in various embodiments—in one embodiment, the client specifies rendering parameters, e.g., "ROADS=red; WATER=blue;" in the URL, and server 102 returns a tile appropriately rendered. In another embodiment, server 102 provides default rendering parameters when it first provides the tile grid URLs to client 108, and client 108 can accept or manipulate them in forming its request for the tiles. In an alternative embodiment, absent a specification of a parameter by client 108, system 100 defaults to a predetermined value for the unspecified parameter.

In one embodiment, a session ID parameter is included as a parameter passed between client 108 and server 102. The session ID is used by server 102, for example, to prevent a cached tile from being sent to a client 108 inappropriately—for example, two clients may request the same dynamically generated tile, but one client may specify different rendering parameters than the other client. Through use of a session ID, server 102 can ensure that a client receives only tiles that have been dynamically generated for that client.

Figure 7A:
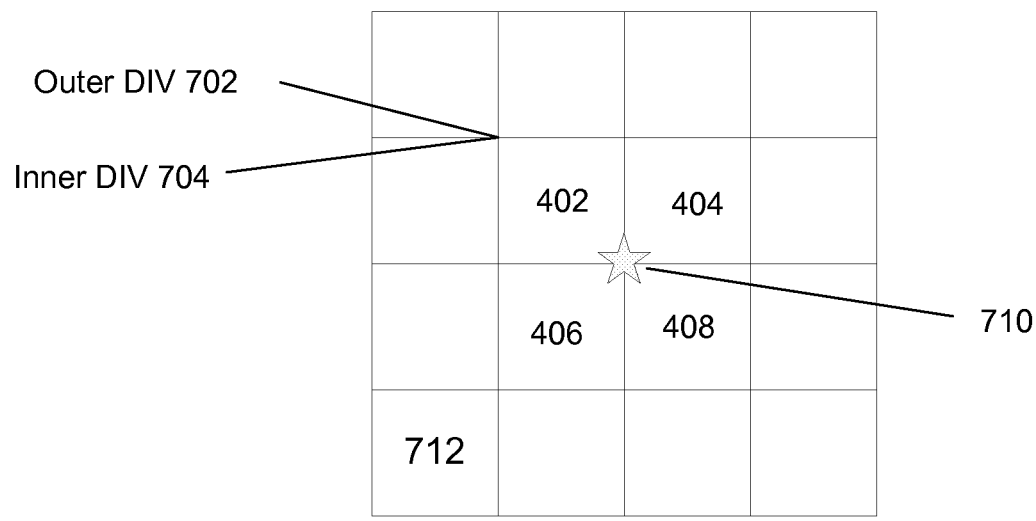
FIGS. 7a, 7b and 7c illustrate movement of a draggable map by a client in accordance with an embodiment of the present invention.
Figure 7B:
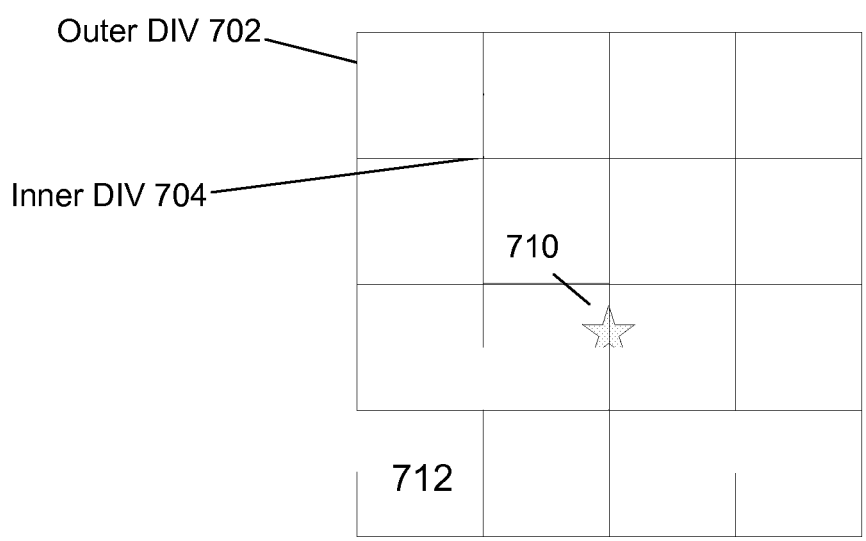
Figure 7C:
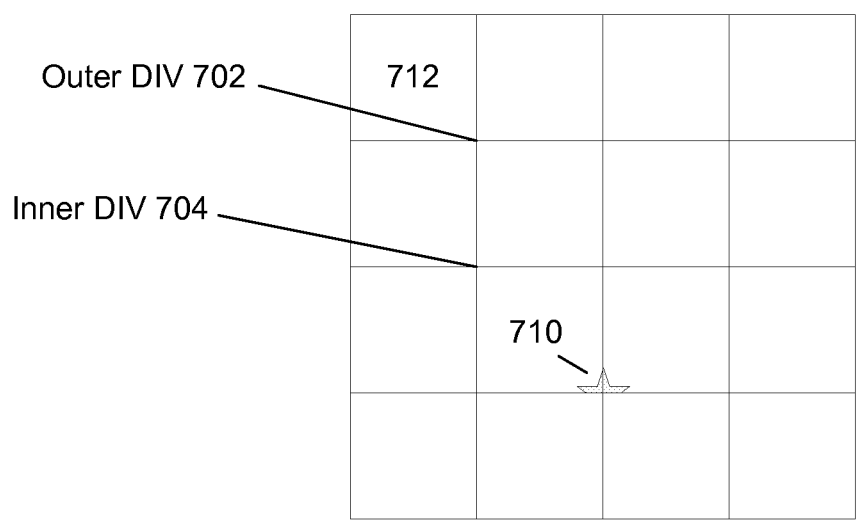

FIGS. 7a, 7b, and 7c illustrate a sequence in which a map is dragged down a page by a user of client 108. The star 710 represents the address or location that was mapped, i.e. the CenterAddress of the TileGrid in the XML code of FIG. 3 and FIG. 5. An outer DIV 702 frames an inner DIV 704 to create a viewable area centered on the inner four tiles 402, 404, 406, 408. The CSS "overflow" attribute is set to hidden on outer DIV 702 so that off-screen peripheral tiles are not seen. The outer DIV 702 has a higher CSS Z-index than the inner DIV 704. The illustrated tile grid of FIGS. 7a, 7b and 7c includes tile 712.

In FIG. 7a, the map has not yet been dragged. Therefore, the inner DIV 704 has a vertical offset of zero from its enclosing outer DIV. The 300 pixel by 300 pixel tile image 712 has a URL with −2 northing and −2 easting, compared to seed tile 404.

In FIG. 7b, the user has dragged the map 150 pixels downwards. None of the images has flipped or changed its offset within the inner DIV. Only the inner DIV has moved relative to the outer DIV.

In FIG. 7c, the inner DIV 704 has been pulled down 1 complete tile (300 pixels) from the enclosing outer DIV 702. Tile 712 has flipped from the bottom of the grid to the top of the grid, acquiring an offset of −300 relative to the inner DIV. Similarly, the image's URL acquires a Northing value that has increased by 4, i.e. it is now +2. This is determined by adding the entire grid height (4 tiles) from the image's initial northing of −2 tiles.

Thus, when client 108 wishes to draw tile 712 with its new content, it need only request the same URL from web server 102 as was originally assigned to the tile, with the exception of altering the northing value to be +2 instead of −2. In this way, the client does not need to specify the coordinates of the tile to be drawn, nor is the client required to maintain any information about the map projection in use—by providing the URL with the updated northing and easting values, the client will obtain the correct dynamically rendered tile from server 102.

System 100 also allows a client 108 to easily zoom in or out as desired without having to track latitude and longitude information.

Instead, the TileGrid request allows the client to simply specify the number of tiles that the map has been specified, in any direction. This is accomplished by the inclusion of Pan elements in the TileGrid request.

FIG. 8 shows an XML request that specifies a zoom factor of 1.0, which in the illustrated embodiment results in a zoom factor of two, i.e. the resulting image is twice as large. In addition to the request described above, the additional tags in FIG. 8 specify the "zoom=1.0" zoom factor as part of the <Output> tag, and in addition to the rows and columns parameter of the <TileGrid> tag, a <Pan> tag is also included, indicating that prior to requesting the zoom, the image with the specified center point was panned 13.17 tiles east and 4.234 tiles south. By specifying this information, client 108 has provided enough information to server 102 for the server to dynamically render the desired tile grid, centered at the appropriate new location, with the requested zoom.

System 100 additionally enables the dynamic rendering of overlay elements on a tile grid. Overlay elements include route geometry, points of interest, text, and the like. An advantage of dynamic tile rendering, as opposed to pre-rendered tiles, is that all routes and other overlays are part of the image tiles, rather than rendered as a separate image with a transparent background, and layered on top of the tiles in the JavaScript client, increasing the complexity of the system.

Overlays in one embodiment are specified as part of the initial TileGrid XML request, and are associated with tiles via the session ID. If a session ID is not provided in the request, server 102 in one embodiment returns a unique session ID. The URL for individual tile images include this session ID.

FIG. 9 illustrates an XML request that includes TileGrid and RouteGeometry tags, specifying a route geometry to overlay on the requested tiles. In the illustrated embodiment, the fitOverlays attribute causes the spatial extent of the tile grid to stretch to cover all the overlays. The <RouteGeometry> tag specifies the route geometry. The route included in FIG. 9 can be determined, e.g., by a DeterminRouteRequest to the deCarta Drill Down Server, or by using other route computation methods. The URLs subsequently rendered by system 100 include both the map data and the overlay.

Note that in an alternative embodiment to those described above, system 100 can return dynamically-rendered tiles in response to the initial tile grid request, in response to a parameter specification. This embodiment is useful, for example, for mobile device applications.

An additional parameter that client 108 can include in the URL request to server 102 specifies the image compression type that server 102 should use in returning the tile. This is beneficial because clients running on different platforms or having different network connections speeds and latencies may seek performance improvements by using files of higher or lower compression.

The present invention has been described in particular detail with respect to a limited number of embodiments.

Those of skill in the art will appreciate that the invention may additionally be practiced in other embodiments. For example, the functionality of the graph-generating engine can be provided in other embodiments by other modules. The present invention also has application beyond the simplification of digital maps. For example, in various embodiments the present invention can be used to simplify polylines in any application in two- or higher-dimensional space, for example in rendering drawings with vectors.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of node creation module 202, link creation module 204 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method comprising:
   transmitting, to a system from a client device, a request for a dynamically generated tile grid, the request specifying a geographic location;
   receiving, from the system at the client device, the dynamically generated tile grid, the dynamically generated tile grid including:
      a seed resource identifier for a seed map tile centered at the geographic location, and
      a plurality of offset resource identifiers for a plurality of offset map tiles, each offset resource identifier indicating an offset of an offset map tile relative to the seed map tile;
   requesting, from the system, a rendered seed map tile and a set of rendered offset map tiles of the plurality of offset map tiles, the request including the seed resource identifier and the offset resource identifiers for the set of rendered offset map tiles;
   displaying, on the client device, the rendered seed map tile;
   storing, on the client device, the set of rendered offset map tiles in a peripheral buffer;
   responsive to a user panning the seed map tile a pan offset relative to the seed map tile,
      accessing, from the peripheral buffer, a rendered offset map tile of the set of rendered offset map tiles with an offset corresponding to the pan offset, and
      displaying the accessed rendered offset map tile.

2. The method of claim 1, further comprising:
   receiving, from the system and at the client device, the rendered seed map tile and the set of rendered offset map tiles.

3. The method of claim 1, wherein the request for the tile grid includes rendering parameters, and the rendered tiles are rendered according to the rendering parameters.

4. The method of claim 1, wherein requesting a rendered seed map tile and a set of rendered offset map tiles further comprises:
    transmitting a session ID to the system; and,
    responsive to the session ID having a first value, receiving at least one of the rendered seed map tiles or offset map tiles that was previously rendered by the system and stored in a tile cache.

5. The method of claim 1, wherein the pan offset is not associated with the offset of any of the stored rendered offset map tiles and the method further comprises:
    determining that the pan offset corresponds to the offset of a particular offset resource identifier of the plurality offset resource identifiers;
    requesting, from the system, a rendered offset map tile of the plurality of offset map tiles corresponding to the particular offset resource identifier; and
    displaying, on the client device, the requested rendered offset map tile whose offset corresponds to the pan offset.

6. The method of claim 5, further comprising:
    requesting, from the system, a second set of rendered offset map tiles of the plurality of offset map tiles, and wherein the second set of rendered offset map tiles surround the offset map tile corresponding whose offset corresponds to the pan offset.

7. The method of claim 1, wherein the rendered seed map tiles and the set of rendered offset map tiles are dynamically rendered by the system.

8. The method of claim 1, wherein geographic location is specified as a street address, and the dynamically generated tile grid is geocoded to the street address to find coordinates of the specified geographic location.

9. The method of claim 1, wherein the request for the tile grid also specifies a tile width and height, a bounding area, and a set of dimensions for the dynamic tile grid.

10. The method of claim 9, wherein the set of dimensions includes a number of columns and a number of rows for the tile grid.

11. A non-transitory computer-readable storage medium storing computer program instructions, the computer program instructions executable by a computer processor to perform operations comprising:
    transmitting, to a system from a client device, a request for a dynamically generated tile grid, the request specifying a geographic location;
    receiving, from the system at the client device, the dynamically generated tile grid, the dynamically generated tile grid including:
        a seed resource identifier for a seed map tile centered at the geographic location, and
        a plurality of offset resource identifiers for a plurality of offset map tiles, each offset resource identifier indicating an offset of an offset map tile relative to the seed map tile;
    requesting, from the system, a rendered seed map tile and a set of rendered offset map tiles of the plurality of offset map tiles, the request including the seed resource identifier and the offset resource identifiers for the set of rendered offset map tiles;
    displaying, on the client device, the rendered seed map tile;
    storing, on the client device, the set of rendered offset map tiles in a peripheral buffer;
    responsive to a user panning the seed map tile a pan offset relative to the seed map tile,
        accessing, from the peripheral buffer, a rendered offset map tile of the set of rendered offset map tiles with an offset corresponding to the pan offset, and
        displaying the accessed rendered offset map tile.

12. The computer-readable storage medium of claim 11, the instructions executable to perform further operations comprising:
    receiving, from the system and at the client device, the rendered seed map tile and the set of rendered offset map tiles.

13. The computer-readable storage medium of claim 11, wherein the request for the tile grid includes rendering parameters, and the rendered tiles are rendered according to the rendering parameters.

14. The computer-readable storage medium of claim 11, the instructions performing operations for requesting a rendered seed map tile and a set of rendered offset map tiles executable to perform further operations comprising:
    transmitting a session ID to the system; and,
    responsive to the session ID having a first value, receiving at least one of the rendered seed map tiles or offset map tiles that was previously rendered by the system and stored in a tile cache.

15. The computer-readable storage medium of claim 11, wherein the pan offset is not associated with the offset of any of the stored rendered offset map tiles, and the instructions executable to perform further operations comprising:
    determining that the pan offset corresponds to the offset of a particular offset resource identifier of the plurality offset resource identifiers;
    requesting, from the system, a rendered offset map tile of the plurality of offset map tiles corresponding to the particular offset resource identifier; and
    displaying, on the client device, the requested rendered offset map tile whose offset corresponds to the pan offset.

16. The computer-readable storage medium of claim 15, the instructions executable to perform further operations comprising:
    requesting, from the system, a second set of rendered offset map tiles of the plurality of offset map tiles, and wherein the second set of rendered offset map tiles surround the offset map tile corresponding whose offset corresponds to the pan offset.

17. The computer-readable storage medium of claim 11, wherein the rendered seed map tiles and the set of rendered offset map tiles are dynamically rendered by the system.

18. The computer-readable storage medium of claim 11, wherein geographic location is specified as a street address, and the dynamically generated tile grid is geocoded to the street address to find coordinates of the specified geographic location.

19. The computer-readable storage medium of claim 11, wherein the request for the tile grid also specifies a tile width and height, a bounding area, and a set of dimensions for the dynamic tile grid.

20. The computer-readable storage medium of claim 19, wherein the set of dimensions includes a number of columns and a number of rows for the tile grid.

* * * * *